(12) United States Patent
Takahashi et al.

(10) Patent No.: US 8,336,921 B2
(45) Date of Patent: Dec. 25, 2012

(54) ROTARY JOINT

(75) Inventors: Hidekazu Takahashi, Tokyo (JP); Mami Uchiyama, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 225 days.

(21) Appl. No.: 12/935,956

(22) PCT Filed: Feb. 13, 2009

(86) PCT No.: PCT/JP2009/052418
§ 371 (c)(1),
(2), (4) Date: Oct. 1, 2010

(87) PCT Pub. No.: WO2009/122782
PCT Pub. Date: Oct. 8, 2009

(65) Prior Publication Data
US 2011/0031744 A1   Feb. 10, 2011

(30) Foreign Application Priority Data
Apr. 3, 2008  (JP) .................................. 2008-097403

(51) Int. Cl.
*F16L 27/00* (2006.01)

(52) U.S. Cl. ...................... 285/121.3; 285/904; 310/270
(58) Field of Classification Search ................. 285/904, 285/272, 121.3–121.6; 310/270
See application file for complete search history.

(56) References Cited

U.S. PATENT DOCUMENTS

| 3,991,587 | A  | * | 11/1976 | Laskaris ........................ 62/50.7 |
| 4,289,985 | A  | * | 9/1981 | Popov et al. ..................... 310/61 |
| 6,412,289 | B1 |   | 7/2002 | Laskaris et al. |
| 6,605,885 | B2 | * | 8/2003 | Laskaris et al. ............... 310/270 |
| 6,605,886 | B2 | * | 8/2003 | Laskaris ....................... 310/270 |

FOREIGN PATENT DOCUMENTS

| JP | 08051767 A | 2/1996 |
| JP | 2003-065477 A | 3/2003 |
| WO | 2006080280 A1 | 8/2006 |

* cited by examiner

*Primary Examiner* — Aaron Dunwoody
(74) *Attorney, Agent, or Firm* — Harness, Dickey & Pierce, PLC

(57) ABSTRACT

A rotary joint of the present invention maintains cryogenic temperature of a supplying refrigerant flowing through a fluid passage, and makes available to lubricate a seal face by the supplying refrigerant as well as to minimize a running cost for the refrigerant.

4 Claims, 9 Drawing Sheets

＃ ROTARY JOINT

TECHNICAL FIELD

The present invention relates to a rotary joint with a mechanical seal device provided at an intermediate of a fluid passage for a refrigerant in order to cool a cooling portion of a superconducting magnetic field coil of a superconducting motor by the refrigerant. Further precisely, the present invention relates to a rotary joint with a mechanical seal device which is available to induce a supplying refrigerant in cryogenic condition by improving a relative rotary portion provided at a fluid passage which connects a refrigerant supplying machine (refrigerating machine) on a stationary side and the cooling portion on a rotary side.

BACKGROUND ART

In a superconducting apparatus such as a superconducting motor and the like, a cryogenic refrigerant such as liquid nitrogen and liquid helium and the like (referred as "supplying refrigerant") must be supplied to a cooling portion such as a superconducting field coil for maintaining a superconducting status of the super conducting field coil. Also, the refrigerant after use at the cooling portion (referred as "discharging refrigerant") must be collected to a refrigerating machine. At this time, it is necessary to maintain the refrigerant supplied to the cooling portion in cryogenic condition, and necessary to reduce an amount of use of the refrigerant which is costly. For example, in order to supply the supplying refrigerant from the refrigerating machine on a stationary side to the superconducting motor which is rotating, the supplying refrigerant must be passed through a rotary joint connecting a fluid passage at a stationary portion and a fluid passage at a rotary portion, in which the stationary portion and the rotary portion are relatively rotating.

In this rotary joint, a seal device for sealing a fluid passage at relatively rotating communication passages with the fluid passage at the stationary portion and the fluid passage at the rotary portion, have a problem of the capability to seal the cryogenic refrigerant due to the cryogenic temperature, in order to seal the supplying refrigerant or the discharging refrigerant in at cryogenic temperature. Also, when the temperature of the supplying refrigerant rises, the superconducting function cannot be achieved without increasing of the amount of the supplying refrigerant, because it cannot be cooled to a predetermined cryogenic temperature. Therefore, there is a problem of increase in the amount of the supplying refrigerant to the cooling portion. When the supplying amount of the supplying refrigerant increases, a problem of the sealing capability of the seal device also occurs.

Further, it has been known that vacuum thermal insulation is excellent for thermal insulation at the time of supplying the supplying refrigerant. However, in order to perform the vacuum thermal insulation, it is difficult to maintain the supplying refrigerant at the cryogenic temperature without heightening a degree of vacuum of a space on an outer circumferential side enclosing the fluid passage. In order to maintain high vacuum for this vacuum thermal insulation, a vacuum seal device for shutting off ambient air is necessary. In this vacuum seal device, since the lubricating capability of seal faces are lost by the vacuum, the seal faces are worn out. As a result, the degree of vacuum which should be used for thermal insulation is lowered. There is a problem that the supplying refrigerant maintained at the cryogenic temperature cannot be supplied to the cooling portion due to a sealing capability of the seal device. Under such condition, because it is necessary to supply a large amount of the supplying refrigerant to the cooling portion in order to maintain the cooling portion at the cryogenic temperature, it becomes a problem that a running cost of the supplying refrigerant, which is costly, increases. Thus, an advantageous rotary joint is required.

In FIG. 9 of Japanese Patent Laid Open No. 2003-65477 (Patent Document 1) (although FIG. 9 is omitted here, numeral references in drawings of the Patent Document 1 are shown after the names of components), a cross sectional view of a cryogenic material transfer joint 26 for supplying the cryogenic fluid to a synchronous generating machine as "a synchronous machine comprising a gas transfer joint for cryogenic gas to a rotor provided with a superconducting coil" is shown. In this cryogenic material transfer joint 26, a tip end 158 of an insert tube 154 on the stationary side is fitted into an inner circumferential face of an inlet tube 156 in non-contact status to constitute a non-contact seal. However, in this non-contact seal, the insert tube 154 merely fits to the inner circumferential face of the inlet tube 156 in non-contact status. Therefore, when inlet cryogenic gas 157 supplied from a cryogenic cooling apparatus 190 flows into the inlet tube 156 through the insert tube 154, there is a risk that part of the cryogenic gas 157 flows into the inside of a cylindrical housing 186 from a gap between the insert tube 154 and the inlet tube 156 which are fitted in non-contact status.

Although the cylindrical housing 186 is maintained in vacuum condition, when the inlet cryogenic gas 157 flows into the cylindrical housing 186, the thermal insulation effect by vacuum condition decreases, because the degree of vacuum in the cylindrical housing 186 is lowered. As a result, because it is necessary to supply the large amount of the inlet cryogenic gas 157 to the cooling portion, the running const increases. Also, supplying large amount of the inlet cryogenic gas 157 to the cooling portion causes a constitutional problem that collection thereof is extremely difficult.

Also, because the cryogenic material transfer joint 26 has a constitution that high temperature cooling gas 164 flows in an annular space between an outer circumference of the cooling inlet tube 156 in which the inlet cryogenic gas 157 flows and a cooling outlet tube 166, there is a risk that the temperature of the inlet cryogenic gas 157 which flows in the cooling inlet tube 156 rises due to the high temperature cooling gas 164.

Also, because a motion gap seal 162 disposed in a cylindrical casing 168 is provided as the inlet cryogenic gas 157 flows on an inner circumferential side and the high temperature cooling gas 164 flows on an outer circumferential side, there is a risk that quality of material deteriorates by the cryogenic temperature to lower the sealing capability. Particularly, in the constitution of the cryogenic material transfer joint 26 which has low thermal insulation effect against the outside, because a large amount of inlet cryogenic gas 157 must be supplied to a super-conducting (SC) coil winding, there is a risk that the motion gap seal 162 deteriorates rapidly.

Further, although it is described that a magnetic fluid seal 176 mounted in a cylindrical hosing 196 prevents the return gas 164 from leaking (refer to paragraph 0046), this structure is unclear. In the magnetic fluid seal 176 known so far, when the inside of the cylindrical housing 186 is vacuumized, the magnetic fluid is sucked into the cylindrical housing 186 so that the sealing capability of the magnetic fluid seal 176 is lowered. For this reason, there is a possibility that the outside air flow 177 flows into the cylindrical housing 186 through the magnetic fluid seal 176, so that the degree of vacuum in the cylindrical housing 186 is lowered. When the degree of vacuum in the cylindrical housing 186 is lowered, the thermal insulation effect of the inlet cryogenic gas 175 cannot be obtained. In an ordinal magnetic fluid seal, it is difficult to maintain this high degree of vacuum.

In a conventional sealing means including the magnetic fluid seal device, because a space on the sliding face is vacuumized so that a lubricant on the sliding face is sucked, the sliding face is worn out. As a result, the air flow 177 and further retuning gas gradually flow into the cylindrical housing 186 through a space between seal faces, so that it becomes difficult to maintain the inlet cryogenic gas 157 below 30° K of the cryogenic temperature. When the inlet cryogenic gas 175 cannot be maintained below 30° K, the superconducting effect of the superconducting coil (coil winding 34) cannot be achieved. Therefore, more flow amount of the inlet cryogenic gas 157 than ordinary flow amount necessary for the superconducting coil must be supplied to the superconducting coil side. In this real scene, because the cooling fluid such as helium and the like are costly, running costs of the synchronous generating machine and the like are increased.

Further, in FIG. 1 or FIG. 3 of Japanese Patent No. 3306452 (Patent Document 2) (although Figs. are omitted here, numeral references in drawings of the Patent Document 2 are shown after names of components), cross sectional views of constitutions, in which a liquid helium injection pipe (1) is inserted into an inner circumferential face of a protruding portion (10) covered by a vacuum layer (2) in the similar way as the Patent Document 1, are shown. In the constitutions, a space is formed between the inner circumferential face of this inserted protruding portion (10) and an outer circumferential face of the liquid helium injection pipe (1). The liquid helium is sealed to be prevented from leaking to the outside by a seal (4) for shutting off a space on an outer circumferential side communicating with the space formed between the inner circumferential face of the inserted protruding portion (10) and the outer circumferential face of the liquid helium injection pipe (1). However, even this constitution of the Patent Document 2, as the Patent Document 1, it is difficult to seal the liquid helium of cryogenic temperature by the conventional seal (4) as similar with the patent document 1, because the liquid helium is cryogenic temperature. It cause various problems on the seal face to seal the liquid helium by the mere seal device with the ordinary constitution. Also, although it has the constitution that the vacuum layer (2) is encapsulated in a space on the outside of the pipe, the thermal insulation effect for a long period to the liquid helium cannot be achieved, because in the encapsulation constitution, the degree of vacuum is decreased with time.

Also, in the constitution that the inlet tube 156 is fitted to the insert tube 154 on the stationary side as shown in the Patent Document 1, or in the constitution that the liquid helium injection pipe (1) is fitted to the protruding portion (10) at the tip end of the rotor towards a bore center (19) (introducing bore) in an axial direction as shown in the Patent Document 2, it becomes difficult to fix the inlet tube 156 on the rotor side or the protruding portion (10) at the tip end of the rotor, so that there is a risk that, when the inlet tube 156 or the protruding portion 10 of the tip end of the rotor is in contact with the relative face, it slides with the insert tube 154 on the stationary side or the liquid helium injection pipe (1) to occur abrasion powders. Also, in this constitution, it is difficult to maintain the degree of vacuum. Further, when a plurality of liquid helium injection pipes (1) is necessary in response to a number of superconducting magnetic field coil, the rotor is complicated in response to numbers thereof to complicate the constitution of the seal device.

Patent Document 1: Japanese Patent Laid Open No. 2003-65477

Patent Document 2: Japanese Patent No. 3306452

DISCLOSURE OF THE INVENTION

Problems to be Solved by the Invention

The present invention has been made by considering the above problems, the purpose is to exert the thermal insulation with high vacuum to a fluid passage in which supplying refrigerant flows by a combination of a seal device and vacuumizing, in order to supply a cryogenic supplying refrigerant to a cooling portion. Further, a purpose is to prevent the sealing capability of a second mechanical seal device which communicates a fluid passage from a stationary side to a rotary side from decreasing due to the supplying refrigerant by this thermal insulation with the high vacuum. Also, a purpose is to improve a sealing capability ov a mechanical seal by modifying a constitution of a fluid passage communicating with a fluid passage connected a refrigerant supplying machine on the stationary side and a connecting fluid passage rotating relatively on the rotary side. Further, a purpose is to improve a sealing capability of a seal face of a mechanical seal to seal a supplying refrigerant. Also, a purpose is to reduce a running cost for refrigerant by improving cooling effect of the refrigerant.

Means for Solving the Problem

A rotary joint of the present invention is a rotary joint for connecting fluid passages for a refrigerant between a refrigerant supplying apparatus on a stationary side and a cooling portion on a rotary side, comprising: a vacuum use cylindrical shaft rotatably supported by a main body and having a vacuum passage penetrating in an axial direction, a coupling portion to make available to communicate with a communication passage of the cooling portion at one end of the vacuum passage, an opening portion for vacuumizing at another end of the vacuum passage, and a connecting portion at a middle of the coupling portion and the opening portion; a mechanical seal device comprising a mechanical seal having a rotary seal ring hermetically fitted to the connecting portion of the vacuum use cylindrical shaft and having respective seal faces at both end faces, a pair of stationary seal rings provided at both sides in an axial direction of the rotary seal ring and having counter seal faces hermetically contacting to the seal faces, a pair of annular elastic bellows having a joint portion at one end connected hermetically with an end portion on an opposite side of the counter seal face of the respective stationary seal rings and a fixed portion at another end enclosing the vacuum use cylindrical shaft and fixed to the main body to press the stationary seal ring elastically to the seal face, a first spaced fluid passage formed between both the elastic bellows and available to communicate with a first fluid passage for introducing a supplying refrigerant, a second fluid passage penetrating through the rotary seal ring in a radial direction and communicating with the first spaced fluid passage; a first outer cylinder hermetically coupled at one end in an axial direction of the mechanical seal device and forming an interval with an outer circumferential face of the vacuum use cylindrical shaft as a first vacuum passage inserted into the first outer cylinder; a second outer cylinder hermetically coupled at another end in an axial direction of the mechanical seal device and forming an interval with an outer circumferential face of the vacuum use cylindrical shaft as a second vacuum passage inserted into the second outer cylinder; a connecting fluid passage provided at inside of the connecting portion, communicated with the second fluid passage at one end, and having a connecting bore at another end; a first pipe arranged in the vacuum passage of the vacuum use cylindrical shaft, and having a fluid passage connected with the connecting bore at one end and available to communicate with the cooling portion; a connection cover having a suction port facing to the opening portion of the vacuum use cylindrical shaft for vacuumizing inside of the vacuum passage; and a magnetic fluid seal device for hermetically coupling the connection cover and the vacuum use cylindrical shaft in relatively rotatable condition and for shutting off a flow between the vacuum passage of the vacuum use cylindrical shaft and an outer circumferential side of the connection cover, wherein the first vacuum passage communicates with a first spaced vacuum passage between an inner circumferential face of the stationary seal ring on one end side of the mechanical seal device and the vacuum use cylindrical shaft, the first spaced vacuum passage communicating with an inner circumference of the counter seal face of the stationary seal ring, the second vacuum passage communicates with a second spaced vacuum passage between an inner circumferential face of the stationary seal ring on another end side of the mechanical seal device and the vacuum use cylindrical shaft, the second spaced vacuum passage communicating with an inner circumference of the counter seal face of the stationary seal ring, and the inner circumferential side of the counter seal face of the stationary seal ring on the one end side and the inner circumferential side of the counter seal face of the stationary seal ring on the another end side are vacuumized by vacuumizing the first vacuum passage and the second vacuum passage.

According to the rotary joint having such constitution, the supplying refrigerant can be maintained in a liquid condition by maintaining the supplying refrigerant which flows in the spaced fluid passages at cryogenic temperature, because the inside of the inner circumferential face of the vacuum use cylindrical shaft is in vacuum thermal insulation condition effectively by the first outer cylinder and the second outer cylinder. As a result, sliding faces can be lubricated by incorporating a liquid between the seal face and the counter seal face by vacuumizing the supplying refrigerant in the liquid condition from the inner circumferential side between the seal faces. Simultaneously, the heat generation can be prevented, because a low temperature lubricating liquid exists between the both seal faces. When sliding faces becomes no lubricating condition, though squealing noise (sneaking) and scuffing are occurred, these squealing noise (sneaking) and scuffing can be prevented efficiently, because the sliding faces are lubricated by the liquid. Then, wearing of the both seal faces is prevented (in a conventional art, even though an advanced seal device, it has been difficult to seal a refrigerant due to lack of lubricating for seal faces. Also, when the seal faces are worn, a problem was induced to a cooling portion and a cooling apparatus by interfusion of abrasion powder with a supplying refrigerant). Then, sealing capability to the supplying refrigerant can be exerted by preventing abrasion of the both seal face at the time of sliding, and the interfusion of the abrasion powder with the supplying refrigerant can be prevented effectively. Further, because a constitution of an elastic bellows integrated with the stationary seal ring makes O-ring for sealing between fitting faces under sliding of the stationary seal ring unnecessary, it is possible to prevent leakage of the refrigerant according to material deterioration of the O-ring due to the cryogenic temperature. Further, even though in the cryogenic condition, the constitution of the elastic bellows elastically presses the counter seal face of the stationary seal ring to the seal face, the sealing capability of the seal face can be exerted, because there is no sliding face for the movement at the time of elastically pressing.

Preferably, the rotary joint of the present invention wherein the mechanical seal device is constituted by two sets of the mechanical seals arranged in parallel, a second spaced fluid passage is provided between both mechanical seals, and the second spaced fluid passage communicates with a second pipe for the discharging refrigerant arranged in the vacuum passage so that a discharging refrigerant flows in the second spaced fluid passage.

According to the rotary joint having such constitution, the supplying refrigerant flowing in the vacuum thermal insulation condition in the inner circumferential surface of the vacuum use cylindrical shaft enclosed with the first outer cylinder and the second outer cylinder in vacuum thermal condition can be in the vacuum thermal insulation condition to be cryogenic temperature. Then, the discharging refrigerant which is still at low temperature by the vacuum thermal insulation flows in a space whose both sides are shut off by fixed portions of the elastic bellows which has no sliding face, when it flows in a second spaced fluid passage. Therefore, since a deteriorate effect is not directly given to the seal faces and the like of the second mechanical seal by the discharging refrigerant, it is possible to prevent the sealing capability of the seal face from decreasing. Also, when the discharging refrigerant enters on the sliding faces side of the seal faces and the counter seal faces of the respective seal rings, since the discharging refrigerant acts on inner circumferential sides of the seal faces, it infiltrate between the seal faces from the circumferential side at the time of sliding to be able to prevent the seal faces from being in non lubricating condition (note that, seal faces on both end sides of the mechanical seal device are lubricated by acting lubricant liquid of the refrigerant liquid by vacuumizing). Then, a durability of the second mechanical seal can be exerted for a long period. Also, because a width of the second spaced fluid passage can be set when arranging two mechanical seals, a large amount of the refrigerant can be flowed, thus, number of fluid passage of the discharging refrigerant can be decreased.

Also preferably, the rotary joint of the present invention wherein a cylindrical first body enclosing the first outer cylinder and the second outer cylinder to form a first vacuum chamber on an outer circumferential side thereof is provided, and the first vacuum chamber is vacuumized.

According to the rotary joint having such constitution, because the cylindrical shaped first body is provided so as to enclose the first outer cylinder and the second outer cylinder and the mechanical seal device by forming the first vacuum chamber, it is excellent in the thermal insulation effect. Then, the supplying refrigerant and the discharging refrigerant are maintained at cryogenic temperature, and the temperature rising of the supplying refrigerant which passes through the mechanical seal device is prevented by vacuum insulation of the mechanical seal device.

Also preferably, the rotary joint of the present invention wherein the rotary seal ring comprises a plurality of the second fluid passages along a circumferential face thereof, and the connecting portion comprises a plurality of connecting fluid passages which communicate to the second fluid passages so that a supplying refrigerant is flowed from the first fluid passage to openings of the respective second fluid passages provided at the circumferential face of the rotary seal ring.

According to the rotary joint having such constitution, because the rotary seal ring have a ring shape, and a large number of second fluid passage which open on a circumferential surface thereof can be provided, the supplying refrigerant flowed out from the one first fluid passage can be flowed to a plurality of second fluid passage from the first spaced fluid passage which is circumference of the rotary seal ring. Then, since fluid passages of the respective first pipes communicate to a plurality of connecting fluid passage which communicate through a plurality of the second fluid passage, the supplying refrigerant can be provided to desired positions of the respective cooling portions with desired amount. Therefore, arranging number of the mechanical seal can be reduced even though the number of fluid passage is large, there is an effect to reduce the cost of the mechanical seal device. Also, because the arranging number of the second mechanical seal composed of the stationary seal ring and the rotary seal ring can be reduced, this results that an axial length of the connecting portion can be shortened, a manufacturing cost and an assembling cost for the second mechanical seal device and the connecting portion can be reduced significantly. Also, the rotary joint can be downsized.

BEST MODE FOR CARRYING THE INVENTION

Below, a rotary joint of embodiments according to the present invention will be explained on the basis of drawings.

Figure 1:
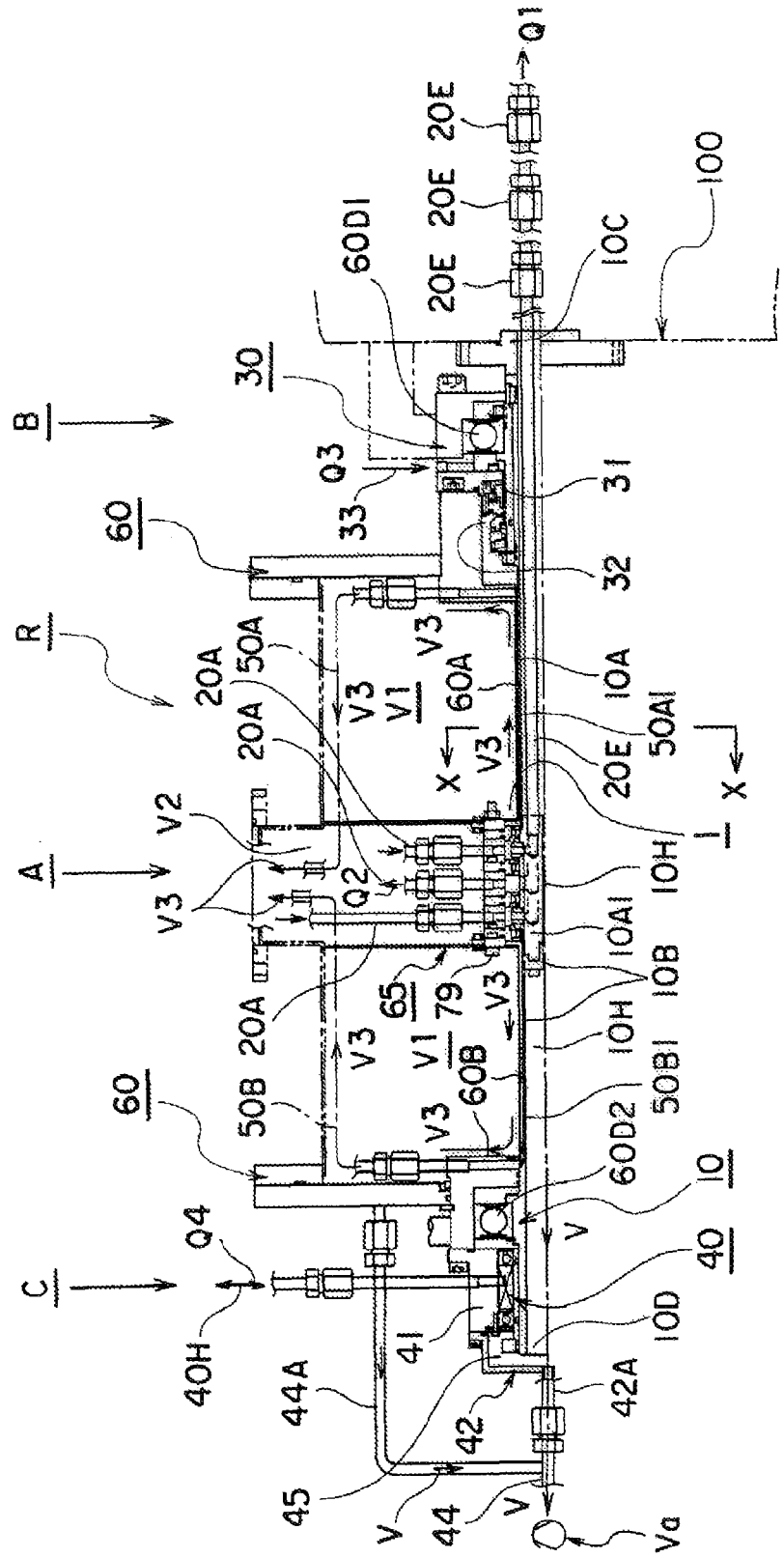
FIG. 1 is a cross sectional view of one side of a rotary joint of an embodiment 1 of the present invention.
Figure 2:
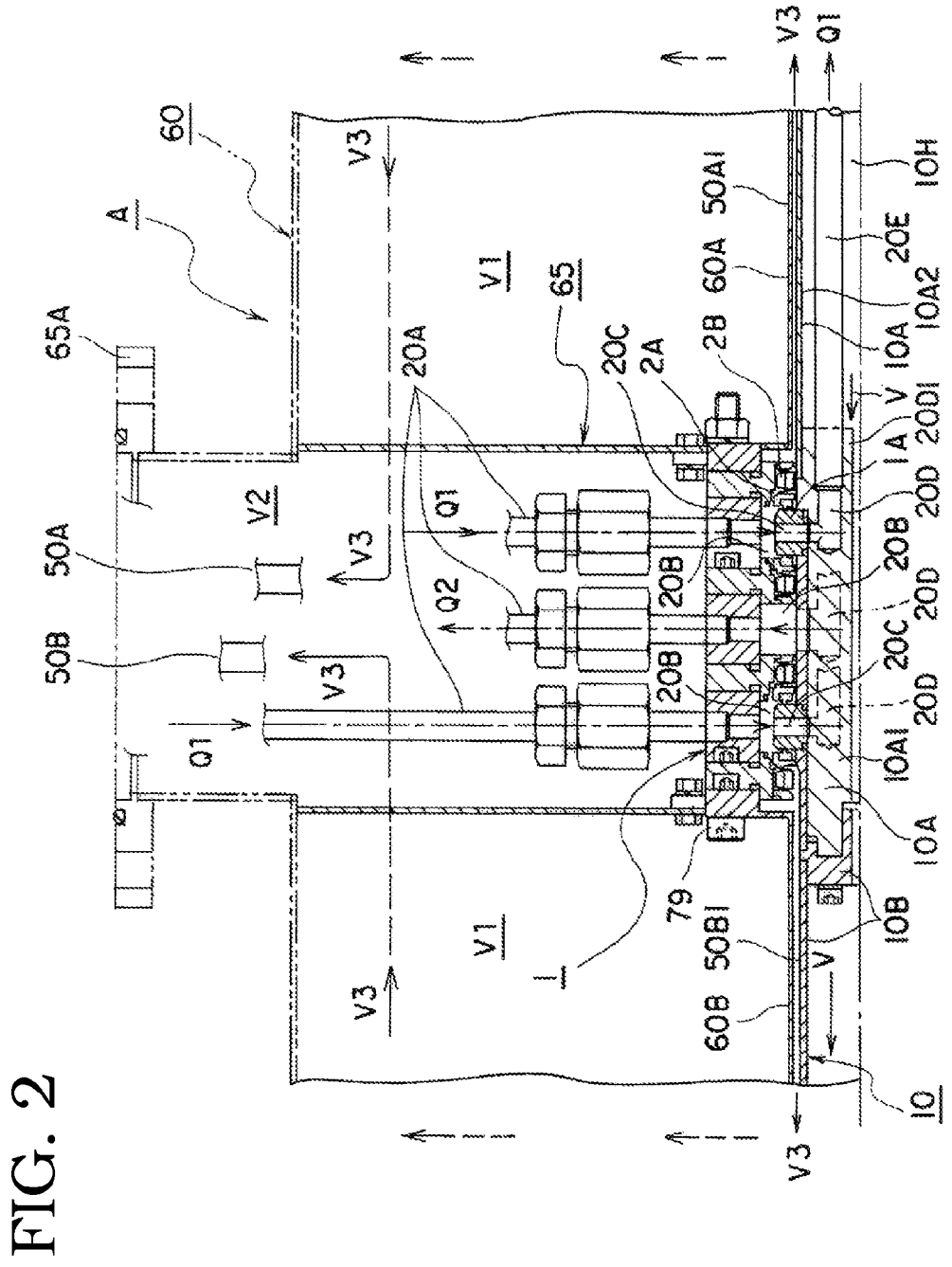
FIG. 2 is an enlarged cross sectional view of a first assembled body showing the vicinity of a mechanical seal device and pipes of FIG. 1.
Figure 3:
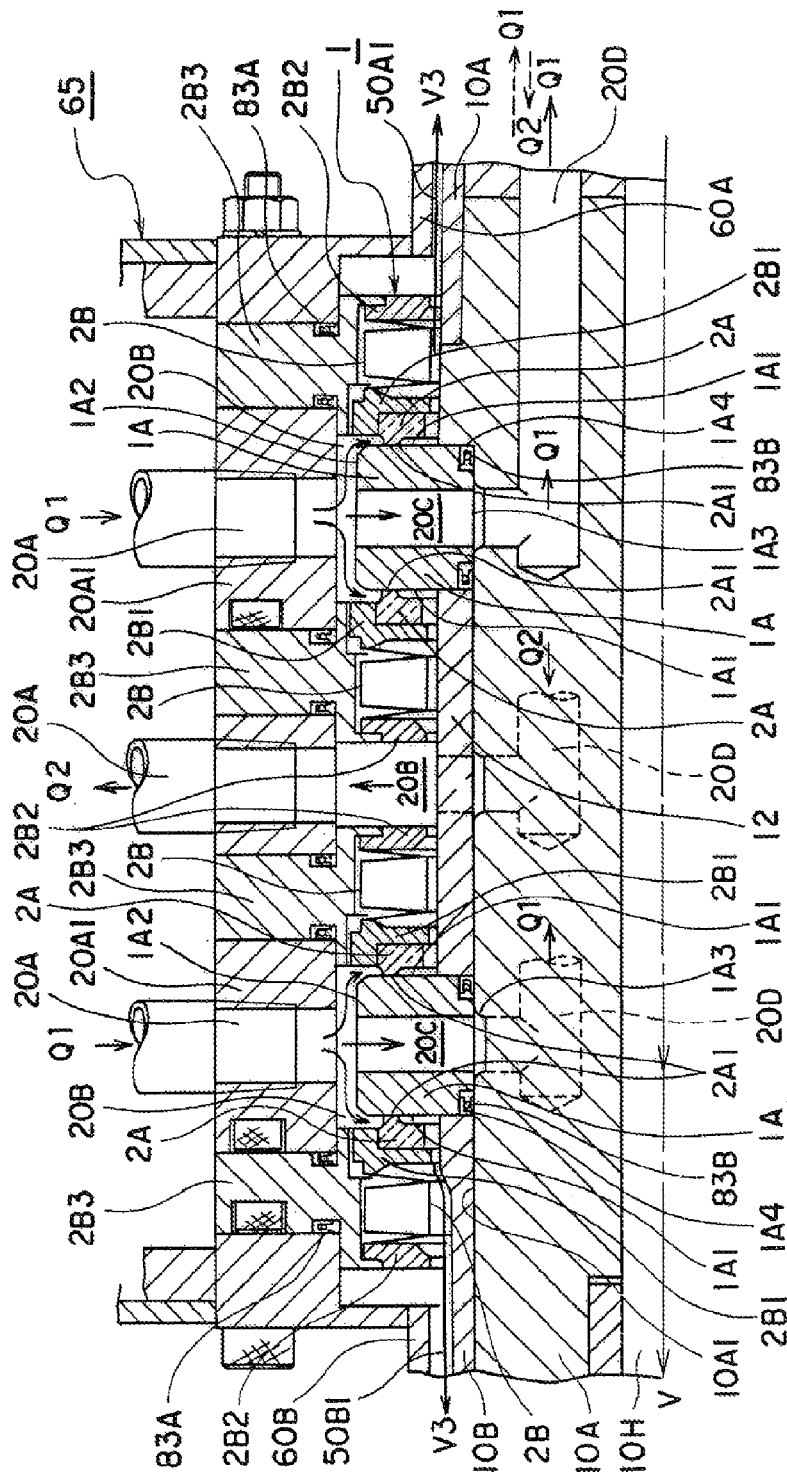
FIG. 3 is an enlarged cross sectional view showing constitutions of the vicinity of the second mechanical seals of FIG. 2.
Figure 4:
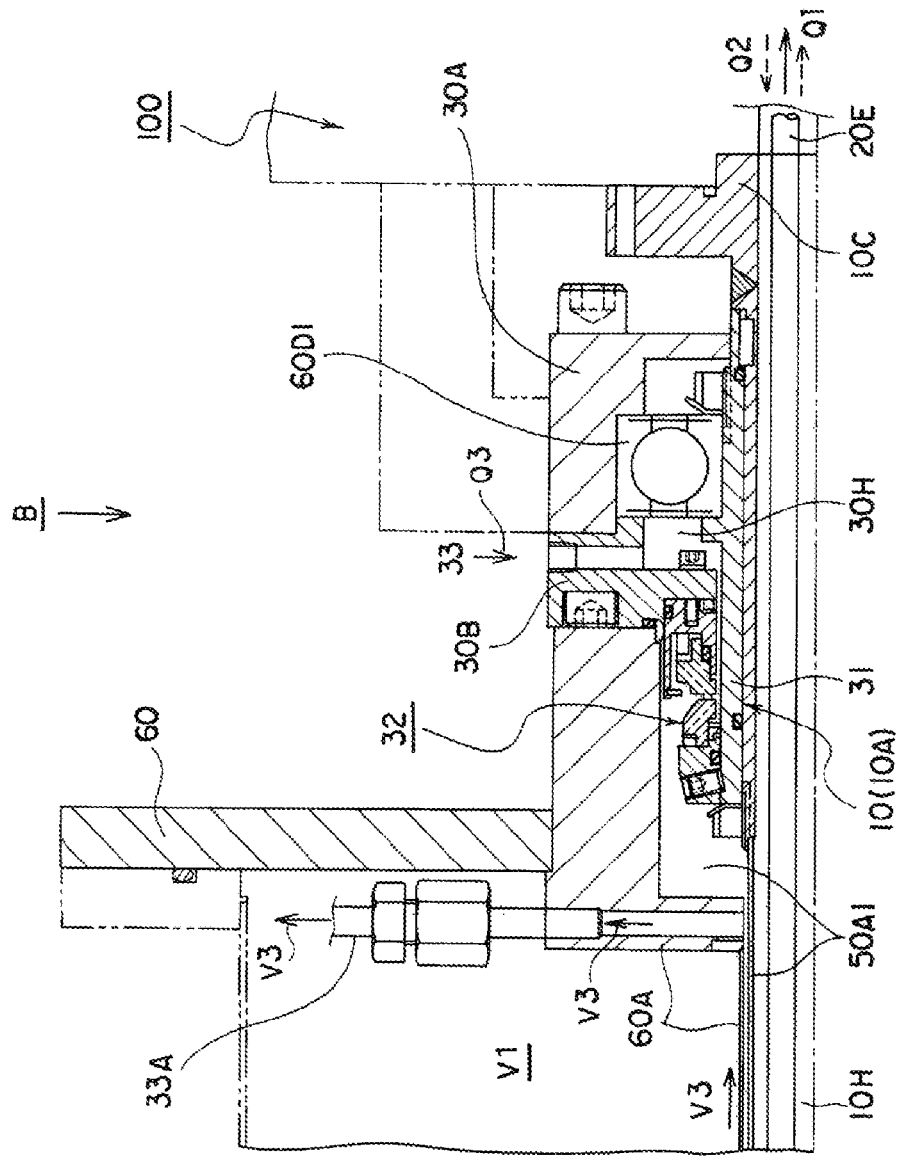
FIG. 4 is a cross sectional view of one side of a second assembled body of FIG. 1.
Figure 5:
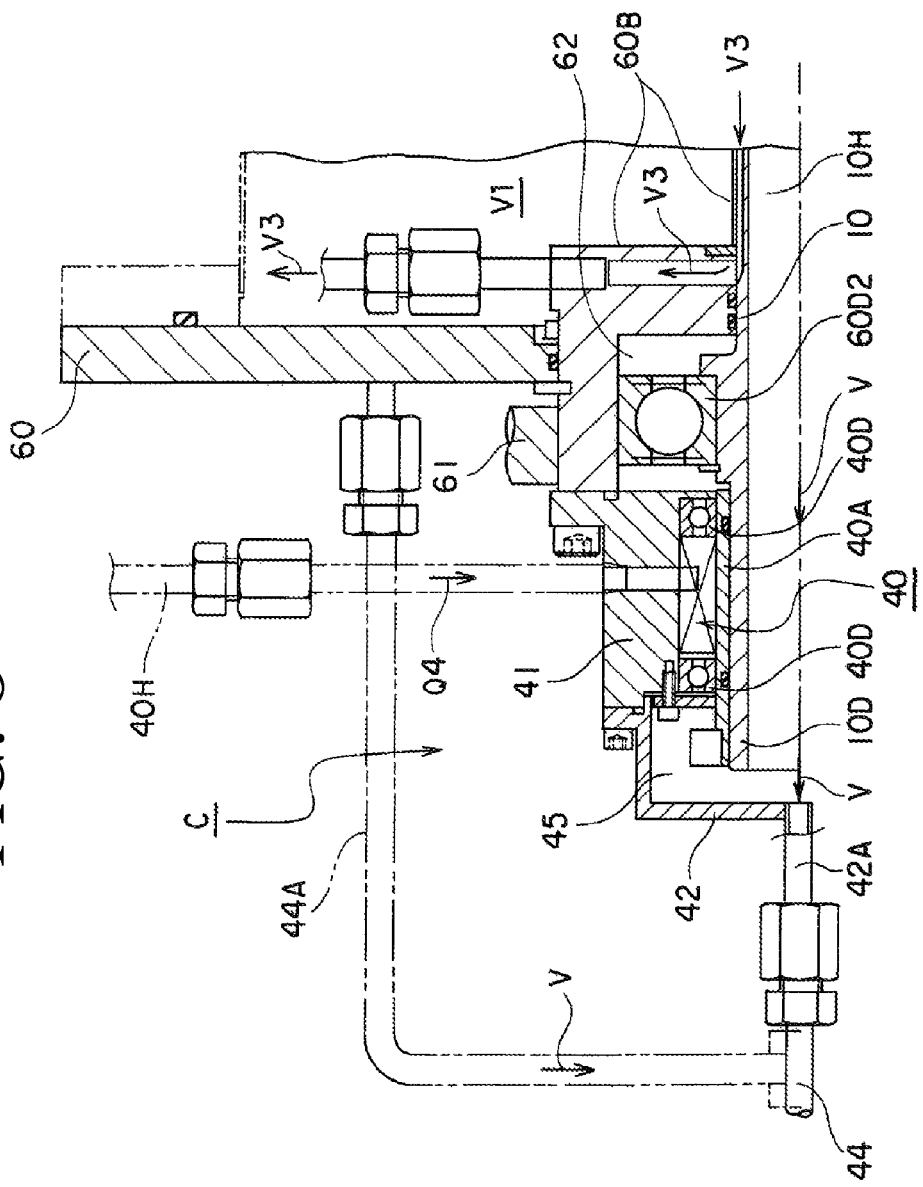
FIG. 5 is a cross sectional view of one side of a third assembled body of FIG. 1.
Figure 6:
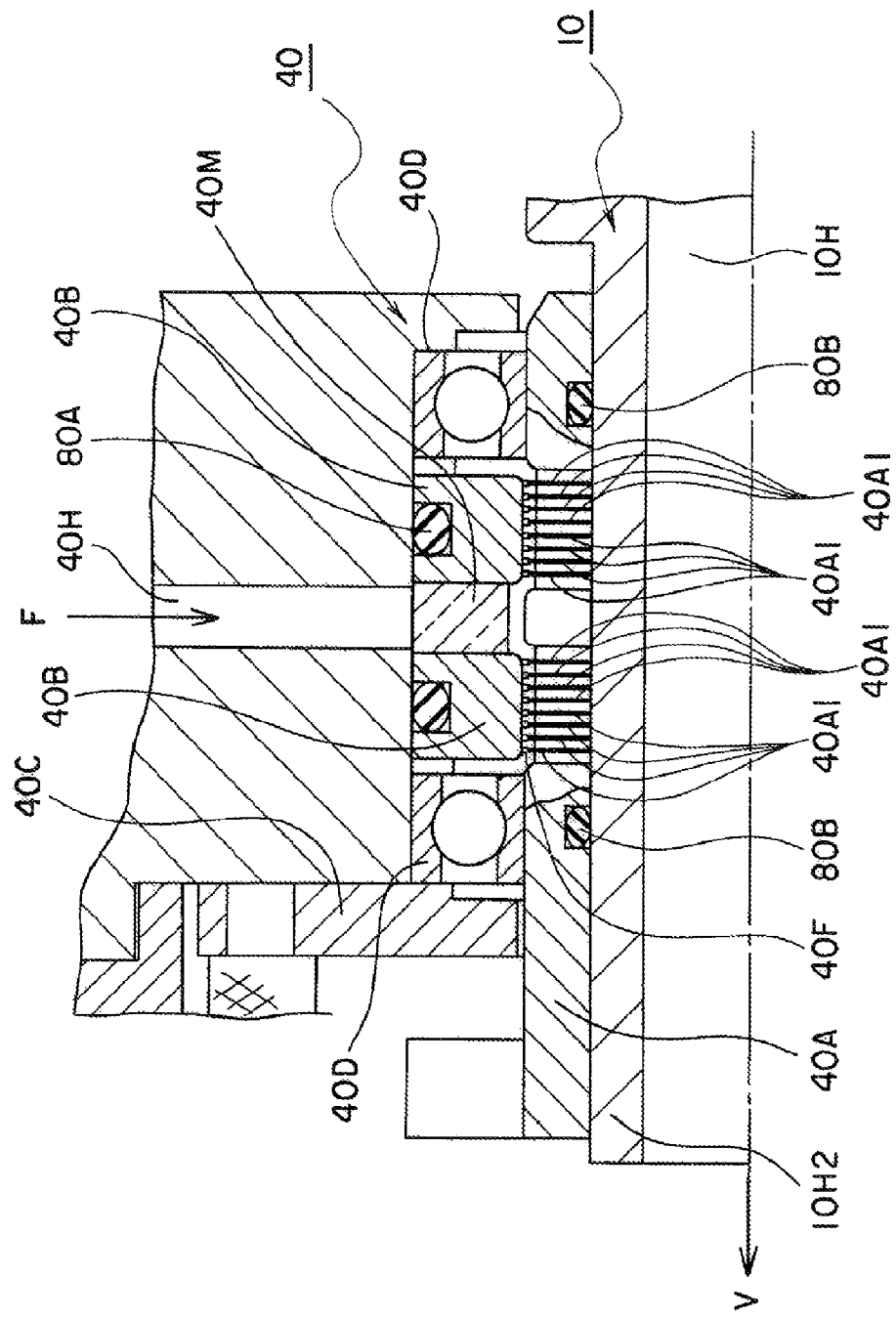
FIG. 6 is an enlarged cross sectional view of one side of a magnetic fluid seal shown in FIG. 5.

Note that, each drawing explained blow are accurate drawings produced based on a design drawing. FIG. 1 is a cross sectional view of one side of a rotary joint "R" of an embodiment 1 of the present invention. Note that, in FIG. 1, hatchings are omitted, because the drawing will be unclear, if the hatching is illustrated in the cross sectional view. Also, FIG. 2 shows the vicinity of a mechanical seal device 1 and pipes of FIG. 1, and is an enlarged cross sectional view of one side of a first assembled body "A". Further, FIG. 3 is a further enlarged cross sectional view showing a constitution of the vicinity of respective second mechanical seal devices 1 of FIG. 2. FIG. 4 is an enlarged cross sectional view of one side of a second assembled body "B" on a first bearing portion 60D1 side. FIG. 5 is an enlarged cross sectional view of one side of a third assembled body "C" on a magnetic fluid seal 40 side. FIG. 6 is an enlarged cross sectional view of the magnetic fluid seal 40 shown in FIG. 5.

Figure 9:
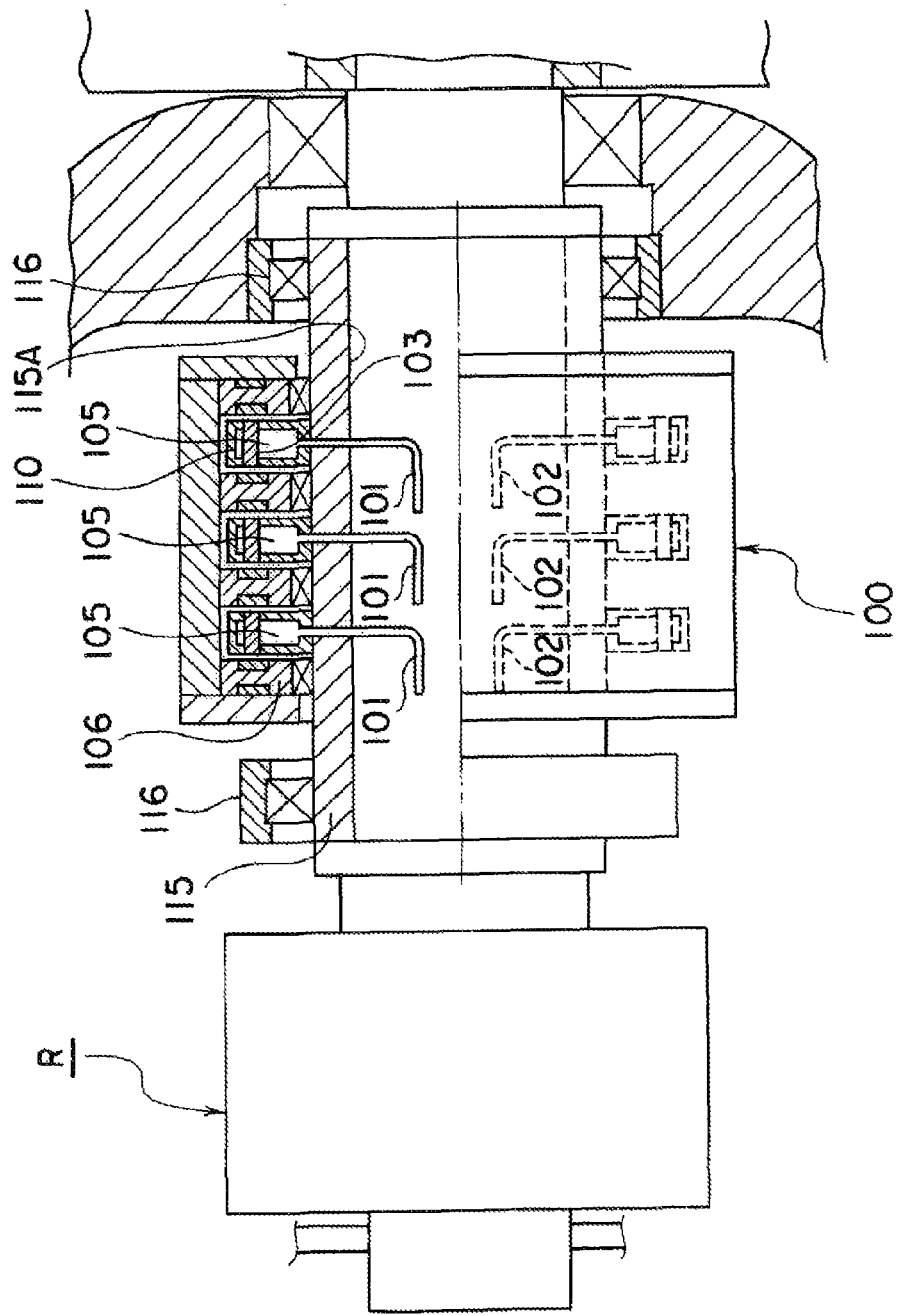
FIG. 9 is a schematic cross sectional view of a superconducting motor to which a rotary joint according to the present invention is mounted.

Below, the rotary joint "R" of the present invention will be explained with reference to FIG. 1 to FIG. 6. A coupling portion 10C of the rotary joint "R" with a flange is coupled with a rotary shaft provided with a fluid passage of a synchronous rotary machine having a magnetic field coil, for example a rotary generator, a linear motor and the like and a rotary shaft 115 provided with a fluid passage of a superconducting motor 100 shown in FIG. 9. Initially, the superconducting motor 100 of FIG. 9 coupled with the rotary joint "R" of FIG. 1 will be explained. Further, with respect to the superconducting motor 100 which is not a present invention, it will be explained briefly. The superconducting motor is shown in FIG. 9 as a schematic view. Three rotors 110 (shown with only one reference numeral) are provided on an outer circumferential face of the rotary shaft 115 having cylindrical shape provided with an inner circumferential face 115A. Stators 106 (shown with only one reference numeral) which are four in total, are arranged on both sides of the rotors 110 in an axial direction. Then, for the respective rotors 110, cooling portions 105 having spaces on inner circumferential sides of superconducting (SC) coils 103 are provided.

To the respective cooling portions 105, first tubes 101, 101, 101, communicating with respective first pipes 20E of the rotary joint "R" which are available to supply the refrigerant. The respective superconducting coils 103, 103, 103 (shown with only one reference numeral) are cooled by the refrigerant supplied to the corresponding cooling portions 105, 105, 105 through the respective first tubes 101, 101, 101. Also, the refrigerant after the cooling of the respective superconducting coils 103, 103, 103 is flowed back to a refrigerant supplying apparatus (refrigerating machine) which is not shown, through a second pipe 20E communicating with the respective second tubes 102, 102, 102 as discharging fluid passages. Note that, bearings 116, 116 are provided on both sides of the rotary shaft 115. Though the case with three rotors 110 has been conveniently explained here, it is not limited to three, but it may be one, two, or three or more. Also, with respect to a constitution of the rotor, there exist constitutions different from the constitution of the exemplified rotor 110. At any rate, however, in order to close an electric resistance of the superconducting coil to zero (0) in a synchronous rotary machine, it is necessary to cool the superconducting coil to the cryogenic condition.

These high temperature superconducting coils must be cooled to, for example, a critical temperature (superconducting transition temperature, for example, 27K) or less, in order to achieve superconducting and to maintain the superconducting. The rotary joint "R" of the present invention has a constitution in which the cryogenic supplying refrigerant "Q1" can be supplied from the stationary side directly to the respective cooling portions 105 through respective connecting fluid passages 20D, 20D of the rotary side, or can be discharged. Then, because the supplying refrigerant "Q1" or a discharging refrigerant "Q2" are flowed through a fluid passage in the first pipe 20E or the second pipe 20E arranged in a vacuum passage 10H which is in the high vacuum condition (the high vacuum is within the range from $10^{-3}$ Torr to $10^{-7}$ Torr), it is possible to maintain the supplying refrigerant "Q1" at the cryogenic temperature which is the critic temperature or lower by the vacuum thermal insulation from ambient air. Then, the first pipe 20E and the second pipe 20E are maintained in the high vacuum condition to shut off heat transfer from the ambient air.

In FIG. 1 and FIG. 9, the coupling portion 10C of a vacuum cylindrical shaft 10 is formed to be coupled with an attaching portion at an end portion of a rotary shaft 115 of the superconducting motor 100 so as to rotate together. Simultaneously, the first pipe 20E is coupled with the first tube 101 to provide a supplying fluid passage which makes available to supply the supplying refrigerant "Q1" from the first pipe 20E to the inside of the first tube 101. Further, the second pipe 20E is also coupled with the second tube 102 to provide a discharging fluid passage which makes available to discharge the discharging fluid "Q2" used for cooling the superconducting coil and the like from the second tube 102 to the second pipe. Note that, this first pipe 20E is not limited to the supplying fluid passage of the supplying refrigerant "Q1", also the second pipe 20E is not limited to the discharging fluid passage of the discharging refrigerant "Q2". The first pipe 20E can be used for the discharging fluid passage. Further, the second pipe 20E can be selected as the supplying fluid passage. However, when the used discharging refrigerant "Q2" is flowed back to the refrigerant supplying apparatus (refrigerating apparatus), it is preferable to use the second pipe 20E in the embodiment of the second mechanical seal device 1 of FIG. 1.

This vacuum use cylindrical shaft 10 connects a connecting portion 10A1 (below, it is called a connecting component.) of a first vacuum use cylindrical shaft 10A that whole body thereof is made of stainless steel and a coupling portion 10B of a second vacuum use cylindrical shaft 10B and couples those by a bolt, which is shown in the Figure, but whose numeral reference is omitted, in the axial direction. In the first vacuum use cylindrical shaft 10A, an end portion of the cylindrical shaft and a face with a step of the connecting component 10A1 are fitted and circumferential faces of the fitting portion are welded to integrate those. Also, in a second vacuum use cylindrical shaft 10B, an end portion of the cylindrical shaft and a face with a step of the coupling portion 10B are fitted to weld those fitted faces. These welded coupling portion 10B and connecting component 10A1 are connected and coupled by a bolt to form the vacuum use cylindrical shaft 10 in a cylindrical shape. This coupling of the first vacuum use cylindrical shaft 10A and the second vacuum use cylindrical shaft is fastened by the bolt so as to make available to mount the second mechanical seal device 1. However, as another example, the mechanical seal device 1 is fitted to a long sleeve which is not shown and the inner surface of the sleeve is fitted and fixed on an outer circumference of the vacuum use cylindrical shaft 10, so that the first vacuum use cylindrical shaft 10A and the second vacuum use cylindrical shaft 10B can be integrated without assembling with a bolt. In the constitution mentioned above, the connecting component 10A1 may be fitted to an inner circumferential face of the first vacuum use cylindrical shaft 10A. Note that, the second mechanical seal device means a seal device formed by assembling the rotary seal ring 1A and stationary seal rings 2A, 2A integrally, in which the stationary seal rings are arranged at both sides of the rotary seal ring 1A as a pair. Then, a whole of combined pluralities of the second mechanical seal devices is called the mechanical seal device 1.

Also, in the connecting component 10A1, a L-shaped connecting fluid passage 20D having cross sections in the radial direction and in the axial direction is provided along the circumferential direction with changing the position in the axial direction. Respective openings at the end portion in the axial direction of the respective connecting fluid passages 20D, 20D are formed as connecting bores 20D1, and end portions of the first pipe 20E and the second pipe 20E are hermetically fitted to the respective connecting bores 20D1 (fitted circumferential faces are sealed by welding or bonding). The first pipe 20E and the second pipe 20E having fluid passages are arranged in the inner circumferential face 10A2 of the first vacuum use cylindrical shaft 10A (in the vacuum passage) so as to make available to flow the cryogenic refrigerant. Simultaneously, the first pipe 20E and the second pipe 20E arranged in the inner circumferential face 10A2 of the first vacuum use cylindrical shaft 10A is vacuum thermally insulated from the outside by the high vacuum condition in which vacuumizing (also called "vacuum suction") is performed. Note that, for materials for the first pipe 20E and the second pipe 20E, stainless steel pipe, copper pipe, aluminium pipe, boron nitride pipe, silica pipe, reinforced glass pipe, law temperature resin (PTFE) pipe, etc. are used. Further, outer circumferential faces of the first pipe 20E and the second pipe 20E may be covered by a thermal insulation material. For example, an outer circumference of the stainless pipe is covered by materials such as PTEF, glass, silica and the like with a thickness which is available to get the thermal insulation. These thermal insulation effects can be achieved by providing the first pipe 20E and the second pipe 20E in the vacuum use cylindrical shaft 10 in the vacuum thermal insulation condition. (Note that, these effects cannot be achieved by the conventional constitution in which a fluid passage for a refrigerant is formed by drilled hole on a housing body with a mechanical seal device.)

FIG. 2 and FIG. 3 are enlarged views of the first assembled body "A" shown in FIG. 1. As shown in FIG. 2 and FIG. 3, the inner circumferential faces 1A3 of the rotary seal rings 1A are fitted on an outer circumferential face of the connecting component 10A1 of the vacuum use cylindrical shaft 10, and are arranged in two lines spaced in the axial direction. Assembling of the rotary seal rings 1A are performed by sandwiching a cylindrical spacer 12 between the both rotary seal rings 1A, 1A arranged in parallel, and fixing both outside ends of the rotary seal rings 1A, 1A in the condition that the outside ends are pressed by the step face of the connecting component 10A1 and an end face of the coupling portion 10B of the second vacuum use cylindrical shaft 10B. In the respective rotary seal rings 1A, 1A, seal faces 1A1, 1A1 are provided at both end faces in the axial direction, and a second fluid passage 20C is provided at an intermediate of the both seal faces 1A1, 1A1. This second fluid passages 20c are connected to inward connecting fluid passage 20D. This respective rotary seal rings 1A and respective stationary seal rings 2A to mention later are made of material which is rigid without wearing out such as silicon carbide, carbon, rigid alloy, composite resin and the like, and which has cold resistance to resist to the refrigerant.

A pair of both stationary seal rings 2A, 2A is provided at both sides in the axial direction of the rotary seal ring 1A. Counter seal faces 2A1 which are closely contact with the seal faces 1A1 are provided at the end faces of the stationary seal rings 2A, 2A. Simultaneously, an annular joint portion 2B1 which is one end of an elastic bellows annularly surrounding the vacuum use cylindrical shaft 10 is joined at a counter side face (back face) of a counter seal face 2A1 as hermetically sealed by welding and the like. The elastic bellows 2B is metallic such as stainless steel, nickel base alloy (Inconel 718) and the like, and is an attached component integrally formed with the stationary seal ring 2A. Also, an annular fixed portion 2B2 which is another end of the elastic bellows 2B is bonded and coupled as hermetically sealed by welding and the like to a step portion of an inner circumference of a seal cover 2B3. Then, the elastic bellows elastically presses the stationary seal ring 2A toward the seal face 1A1. Note that, in the mechanical seal device 1, a gap is formed between the inner circumferential face of the elastic bellows 2B on the second assembled body "B" side and the outer circumferential face of the first vacuum use cylindrical shaft 10A. This gap reaches so far as the inner circumference of the counter seal face 2A1. That is, this gap is a first spaced vacuum passage, which is a part of the first vacuum passage 50A1 (refer the enlarged view of FIG. 3).

Figure 8:
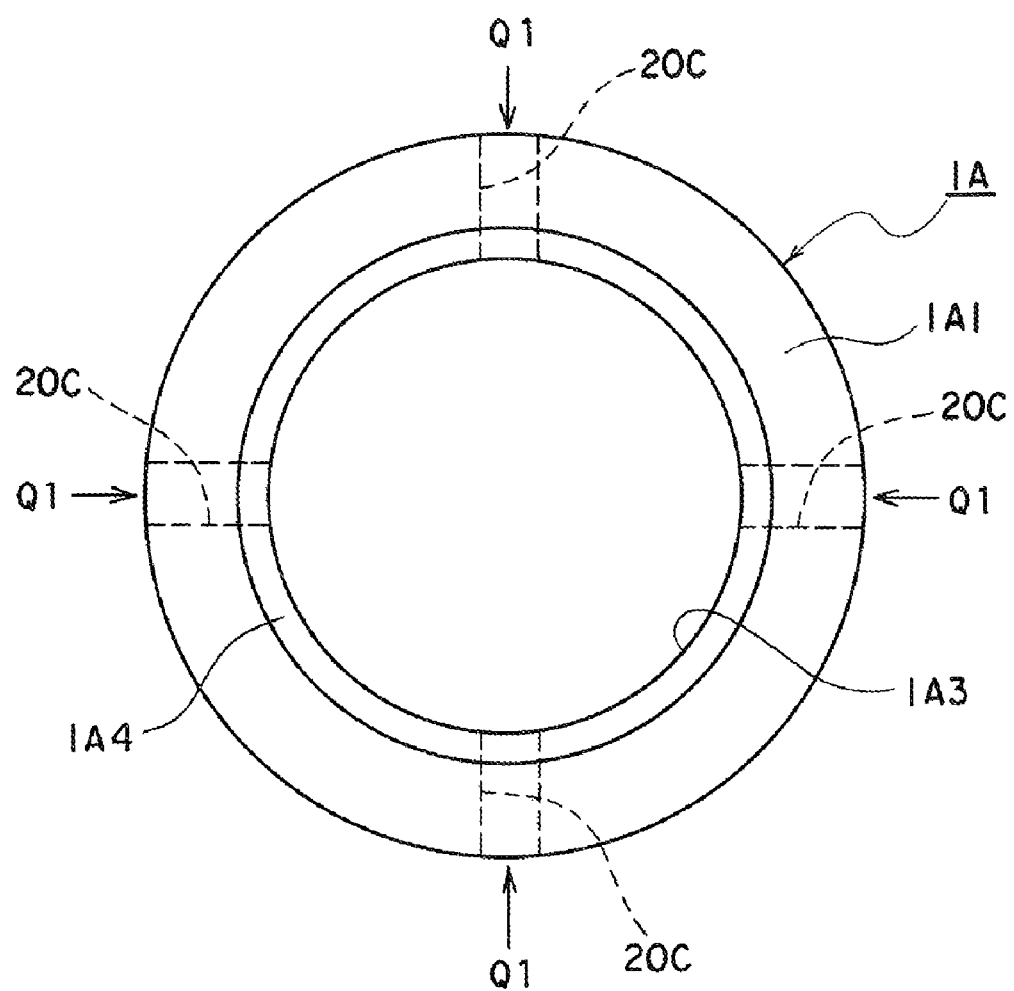
FIG. 8 is a front view of a rotary seal ring of an embodiment in an axial direction according to the present invention.

Further, in the mechanical seal device 1, another gap is also formed between the inner circumferential face of the elastic bellows 2B on the third assembled body "C" side and the outer circumferential face of the second vacuum use cylindrical shaft 10B. And then, this gap reaches so far as the inner circumference of the counter seal face 2A1. This gap is a second spaced vacuum passage, which is a part of the first vacuum passage 50B1 (refer the enlarged view of FIG. 3). Further, a space between an outer circumferential face 1A2 of the rotary seal ring 1A and the stationary seal rings 2A, 2A of both sides of the rotary seal ring 1A (a space between the both elastic bellows 2B, 2B) is formed on a first spaced fluid passage 20B. The first spaced fluid passage 20B communicates with the first fluid passage 20A to which a pipe coupling portion 20A1 is provided. Note that, the first fluid passage 20A is a fluid passage to which the supplying refrigerant "Q1" is forwarded from the refrigerant supplying apparatus. Also, an annular space formed between fixed portions 2B2, 2B2 of the both elastic bellows 2B, 2B, and between an outer circumferential face of the spacer 12 and the inner circumferential face of the pipe coupling portion 20A1 (refer FIG. 3) is a second spaced fluid passage 20B. This second spaced fluid passage 20B directly communicates with a connecting fluid passage 20D because following second fluid passage 20C does not exist. Namely, a first spaced fluid passage 20B which communicates with the second fluid passage 20C of the rotary seal ring 1A and the second spaced fluid passage 20B which does not communicates through the second fluid passage 20C are provided between the second spaced fluid passage 20B and the connecting fluid passage 20D. (The first spaced fluid passage 20B and the second spaced fluid passage 20B have the same reference numerals, Refer FIG. 3.)

seal rings 83A having C-shaped or U-shaped cross section are provided for connections between respective annular seal covers 2B3, 2B3, 2B3, 2B3 and annular pipe coupling portions 20A1, 20A1, 20A1 to seal the respective connections (in FIGS. 3, 8 seal rings are provided in the axial direction). These seal rings 83A are constituted in a shape that an elastic hollow O-ring composed of metal (Inconel 718 and the like material) is provided in an u-shaped groove composed of PTFE or in a shape of C-shaped metal ring, and are made with cold resistance to resist the refrigerant. Then, those seal covers 2B3 and pipe coupling portions 20A1 are sandwiched between a flange portion welded at an end portion of a first outer cylinder 60A and a flange portion welded at an end portion of a second outer cylinder 60B, and fastened by the bolt 79 (refer to FIG. 1 or FIG. 2) to form a cover which covers the second mechanical seal device 1. Also, the respective pipes communicating with the first fluid passages 20A of the respective pipes coupling portions 20A1 are formed by resin pipes, steel pipes (stainless steel pipes and the like) so as to communicate with the cooling fluid supplying apparatus which is not shown through the inside of a second vacuum chamber V2 of a second main body 65. The respective pipes may be used for vacuumizing by connecting with a branch pipe 44A shown in FIG. 5.

Then, the supplying refrigerant "Q1" supplied to the cooling portion 105 through the respective fluid passages 20C provided to the respective rotary seal rings 1A, is the cryogenic liquid helium, cryogenic liquid nitrogen and the like. Also, the discharging refrigerant "Q2" flowed back to the cooling fluid supplying apparatus through the second spaced fluid passage 20B is a refrigerant after cooling the cooling portion 105 (there is a case that the refrigerant is evaporated). Note that, kinds of the supplying refrigerant "Q1" is liquid helium (−273° or below), liquid nitrogen (−196° or below), liquid neon, liquid argon and the like. These supplying refrigerant "Q1" is cooled at cryogenic temperature which is available to cool the superconducting coils and the like to make the superconducting condition. Next, in the second cooling chamber V2 of the second main body 65 is high vacuum status and is available to make vacuum thermal insulation to the respective first fluid passages 20A. The second cooling chamber V2 is vacuumized through the branch pipe 44A. Also, it is available to prevent temperature of the supplying refrigerant "Q1" from rising by covering circumference of pipe of the branch pipe 44A, the first fluid passage 20A and the like with a thermal insulation material of a fiber reinforced resin such as PTFE and the like. Further, as shown in FIG. 2, the cylindrical second main body 65 arranged in the radial direction to the vacuum use cylindrical shaft 10, is coupled hermetically with a mounting plate provided at the flange portion of the first outer cylinder 60A and a mounting plate provided at the flange portion of the second outer cylinder 60B by using a bolt as shown in FIG. 2. Then, although the second main body 65 is formed in a cylindrical shape in the radial direction thereof is arranged in the first main body 60, if a large number of the first fluid passages 20A exist, it may be formed as a cylindrical body hermetically enclosing an axial core of the vacuum use cylindrical shaft 10.

an inner diameter of the inner circumferential face of the first outer cylinder 60A is formed larger than an outer diameter of the first vacuum use cylindrical shaft 10A. And then, the first outer cylinder 60A is fitted to the first vacuum use cylindrical shaft 10A with providing an annular space of a first vacuum passage 50A1. Also, the second outer cylinder 60B is formed in an almost same shape which is symmetric the first outer cylinder 60A. And then, the second outer cylinder 60A is fitted to the outer circumferential face of the second vacuum use cylindrical shaft 10B with providing an annular space of a second vacuum passage 50B1. Next, in FIG. 3, the first vacuum passage 50A1 in this first outer cylinder 60A communicates with a first spaced vacuum passage (also called as "first spaced passage") between an inner circumferential face of the elastic bellows 2B on the second assembled body "B" side in the second mechanical seal device 1 and an outer circumferential face of the connection component 10A1. Then, the first spaced vacuum passage reaches to an inner circumferential side of sliding faces of the seal face 1A1 of the rotary seal ring 1A and the counter seal face 2A1 of the stationary seal ring 2A. Also, in FIG. 3, the second vacuum passage 50B1 communicates with a second spaced vacuum passage (also called as "second clearance passage") between an inner circumferential face of the elastic bellows 2 on the third assembled body "C" side in the second mechanical seal device 1 and an outer circumferential face of the connection component 10A1. The second spaced passage reaches to an inner circumferential side of sliding faces of the seal face 1A1 of the rotary seal ring 1A and the counter seal face 2A1 of the stationary seal ring 2A.

Then, the supplying refrigerant "Q1" flows from the respective fluid passages 20A, 20A through the respective first spaced fluid passages 20B, 20B into the respective second fluid passages 20C, 20C. At this time, because the rotary seal ring 1A rotates, it will be difficult to infiltrate the supplying refrigerant "Q1" as a lubricating film between the respective seal faces 1A1 and the counter seal faces 2A1. That is, it will become non-lubricating condition easily (in a conventional art). As this conventional art, when the sliding face becomes in non-lubricating condition, following problems will be occurred. Namely, the both seal faces 1A1 and 2A1 wear out due to heat generation by sliding. The heat generation by sliding cause a problem of cooling on the refrigerant, because it causes temperature rising of the supplying refrigerant "Q1". Also, when the both seal faces 1A1 and 2A1 wear out, fine powder due to abrasion is mixed in the supplying refrigerant "Q1", flows into the cooling portion 105, and evokes trouble to the cooling portion 105 and the like. Also, since the powder in the refrigerant is not suitable for the refrigerant supplying apparatus, when the discharging refrigerant including the powder after cooling the cooling portion 105 flows back to the refrigerant supplying apparatus, a problem is occurred on the refrigerant supplying apparatus.

However, in the present invention solving to this problem, the respective first and second spaced vacuum passages (respective vacuum passages 50A1) on an inner circumferential side of seal faces of the seal face 1A1 of the rotary seal ring 1A and the counter seal face 2A1 of the stationary seal ring 2A are vacuumized V3, the supplying refrigerant "Q1" on the respective first and second spaced fluid passages 20B, 20B side is sucked into a space between the sliding faces of the seal face 1A1 and the counter seal face 2A1 and exists as a lubricating liquid of a liquid refrigerant between the both seal faces 1A1 and 2A1. Namely, since the supplying refrigerant Q1 to which the vacuum thermal insulation is exerted is in liquid condition, it lubricates a space between the sliding faces of the seal face 1A1 and the counter seal face 2A1 and prevents sliding heat generation between the both seal faces 1A1 and the 2A1 efficiently. Therefore, the present invention solves the problem due to the above mentioned non-lubricating condition effectively.

Also, when the both seal faces 1A1, 2A1 are in non-lubricating condition, though burn-in and/or squealing noise (sneaking) occur easily, these problems can be prevented effectively by a condition that the supplying refrigerant "Q1" exists between the seal face 1A1 and the counter seal face 2A1. Note that, because the discharging refrigerant "Q2" flowing back to the refrigerant supplying apparatus through the second spaced fluid passage 20B exists, when it is in liquid condition, on an inner circumferential side of the sliding faces of the seal face 1A1 and the counter seal face 2A1, the discharging refrigerant enters between the seal face 1A1 and the counter seal face 2A1 by suction force toward the outside in the radial direction due to sliding, so that it is effectively prevented that the sliding faces are in non-lubricating condition (even though part of the discharging refrigerant "Q2" gasifies, it flows directly onto the refrigerant supplying apparatus side through the first fluid passage 20A, because gaseous body has lightweight. Also, abrasion is prevented, because the elastic bellows 2B has a bellows like shape and has no sliding face. Further, since the elastic bellows 2B can be made of stain-less steel or cold resistance resin, an advantageous capability can be exerted to the refrigerant. Further, because the second spaced fluid passage 20B is formed between the fixed portions 2B2, 2B2 in the respective stationary rings 2A, 2A differently from a conventional second fluid passage 20C which is bore shape, it is possible to set a width of the fluid passage at desired size as a fluid passage for enlarging the flow rate. Therefore, it is possible to make conditions so as not to exist any impulities between both seal faces 1A1, 2A1, and further, so as not to enter gas, due to a faster speed and a flow amount of the discharging refrigerant "Q2" which flows in the second spaced fluid passage 20B.

Next, as shown in FIG. 4, a first vacuum passage 50A1 which connects with a joint of a vacuum passage pipe 33A and vacuumizing V3 is formed at a large diameter cylindrical end portion 60A of the first outer cylinder 60A. For this first vacuum passage 50A1, a plurality of penetrating bores are provided with uniform assignment or non-uniform assignment along a circumferential face of the large diameter cylindrical end portion 60A to vacuumize the passage strongly. Since this vacuumizing V3 can be done strongly by a large number of the through holes, it is possible to make the first vacuum passage 50A1 in the first outer cylinder 60A as ultra-high vacuum condition ($10^{-7}$ Torr or more). Accordingly, the effect of the vacuum thermal insulation improves dramatically, because the supplying refrigerant "Q1" in the respective pipes 20E" is covered by double vacuum layers to the outside. Also, the first vacuum passage 50A1 in the first outer cylinder 60A communicates with the first vacuum passage 50A1 in the vacuum passage pipe 33A (whole passage is vacuum passage), and the vacuum passage pipe 33A is arranged in the first vacuum chamber V1 to be in the vacuum thermally insulated condition, further arranged in the second vacuum chamber V2 to also be in the vacuum thermally insulated condition, and connected with the first vacuum pipe 50A in the second vacuum chamber V2. Then, another end portion of the first vacuum pipe 50A is connected with the refrigerant supplying apparatus. By this first vacuum passage 50A1 in the vacuum passage pipe 33A, the first spaced vacuum passage 50A1 in the second mechanical seal device 1 and the first vacuum passage 50A1 in the first outer cylinder 60A are vacuumized in high vacuum condition V3, maintain the cryogenic temperature of the supplying refrigerant "Q1" effectively, and make it available to lubricate the respective seal faces 1A1 and 2A1. Note that, as similar with the vacuum use cylindrical shaft 10, the first outer cylinder 60A is made of stainless steel, nickel based alloy and the like.

The second outer cylinder 60B shown in FIG. 5 is formed in an almost symmetric shape to the first outer cylinder 60A and as similar shape therewith. Then, as similar with the above mentioned first outer cylinder 60A, the second vacuum passage 50B1 (refer to FIG. 2) connected with an end portion of the second vacuum pipe 50B shown in FIG. 1 to vacuumize the pipe, is formed. For this second vacuum passage 50B1, a plurality of penetrating bores are provided with uniform assignment or non-uniform assignment along a circumferential face of the large diameter cylindrical end portion 60B to vacuumize the passage strongly. As a result, the second spaced vacuum passage 50B1 is vacuumized V3 by the second vacuum passage 50B1 in the second outer cylinder 60B, so that, as mentioned above, the lubricating effects is exerted between the both seal faces 1A1, 2A1 at the time of sliding. Simultaneously, the cryogenic temperature of the supplying refrigerant "Q1" is maintained by the double vacuum thermal insulation of the first vacuum passage 50A1 and vacuum passage 10H.

Next, in the cylindrical first main body 60 having the first vacuum chamber V1 inside, the vacuum thermal insulation is exerted by the first vacuum chamber V1 enclosing the outer circumferential side of the vacuum use cylindrical shaft 10 triply, and also the vacuum thermal insulation is exerted on the outer circumferential side of the second mechanical seal device 1. Also, on the second mechanical seal device 1, the first fluid passage 20A, the first and the second spaced fluid passage 20B, the second fluid passage 20C, and the connecting fluid passage 20D, the vacuum thermal insulation is exerted securely by the second vacuum chamber V2 in the second main body 65. Also, even if the supplying refrigerant "Q1" leaks outward from the first spaced fluid passage 20B being through the second mechanical device 1 and the like by a reason that the rotary joint "R" reaches the durable period, it is prevented efficiently that the supplying refrigerant "Q1" leaking outward causes a pollution problem, because the supplying refrigerant "Q1" is sucked by the second vacuum chamber "V2".

A second assembled body "B" is provided on the superconducting motor 100 side of the vacuum use cylindrical shaft 10 to the first assembled body "A" in FIG. 1. The second assembled body "B" is shown in FIG. 4 in an enlarged view. In a first bearing portion 60D1 which supports the vacuum use cylindrical shaft 10 in rotatable condition at one side thereof, an outer circumferential face thereof is fitted to an inner circumferential face of a first bearing box 30A. Also, the first bearing portion 60D1 is provided by fitting an inner circumferential face thereof to an outer circumferential face of the sleeve 31. Further, the sleeve 31 is fitted to an outer circumferential face of the vacuum use cylindrical shaft 10. Also, the first bearing box 30A is mounted and fixed to a case of the superconducting motor 100 by a retainer shown by a virtual line. Still further, a retaining plate 30B is provided on a side face of the opening of the first bearing box 30A which retains the first mechanical seal device 32 and supports the first bearing portion 60D1 in the axial direction. Fluid "Q3" such as air, lubricating fluid and the like is supplied into a fluid space 30H and on the first bearing portion 60D1 side through a supplying passage 33 provided on this supporting plate 30B. The fluid "Q3" flows from the supplying passage 30 into the fluid space 30H to act as buffer fluid to the first mechanical seal device 32. Also, it is available to supply the lubricating fluid to the bearing portion 60D1 to exert the lubricating action. A rotary seal ring (numeral reverence is omitted) of the first mechanical seal device 32 is fitted to a sleeve 31 made of stainless steel by accompanying components. Also, a stationary seal ring relatively rotating with the rotary seal ring is retained at a bore with a step of the retaining plate 30B by accompanying components. Then, the fluid space 30H on the first bearing portion 60D1 side and the first vacuum passage 50A1 in the first outer cylinder 60A are shut out by the first mechanical seal device 32. The large diameter cylindrical end portion 60A on the retaining plate 30B side of the first outer cylinder 60A is fitted to the inner circumferential face of the first main body 60, and the flange portion on the second mechanical seal device 1 side is coupled to the second main body 65 by the seal cover 2B3 mentioned above.

A third assembled body "C" is provided at an opposite side to the second assembled body "B" in the vacuum use cylindrical body 10 whose whole constitution are shown in FIG. 1. At the large diameter cylindrical end portion 60B of the second outer cylinder 60B fitted to the inner circumferential face of the first main body 60, the second bearing portion 60D is provided at a bore with a step of an inner circumference thereof. Further, the large diameter cylindrical end portion 60B is supported by a plurality of support 61. an inner circumferential face of a second bearing portion 60D2 is fitted to an outer circumferential face of the second vacuum use cylindrical shaft 10B (refer to FIG. 1). Then, the vacuum use cylindrical shaft 10 is supported in rotatable condition by the first bearing portion 60D1 and the second bearing portion 60D2. In a space formed on the side of the second bearing portion 60D2, though it is not shown in the drawings, a supplying passage is communicated as similar with the case shown in FIG. 4. A magnetic fluid seal cover 41 made of non-magnetic material such as stainless steel and the like is coupled at the end portion of the second outer cylinder 60B by a bolt whose numeral reference is omitted. The magnetic fluid seal device 40 shown in FIG. 6 is mounted on an inner circumferential face of the magnetic fluid seal cover. High accuracy bearings 40D, 40D are provided at both sides of the magnetic fluid seal device 40 in the inner circumferential face of the magnetic fluid seal cover 41. Inner circumferential faces of the both bearings 40D, 40D are fitted to a shaft cover 40A of the magnetic material, and outer circumferential faces thereof are fitted to an inner circumferential face of the magnetic fluid seal cover 41. Further, the shaft cover 40A is fitted to the outer circumferential face of the second vacuum use cylindrical shaft 10B with O-rings 80B, 80B with cold resistance characteristics arranged in parallel therebetween.

Then, two lines of sealing projection groups 40A1, 40A1 with a certain interval in the axial direction are provided on an outer circumferential face of the shaft cover 40 made of a magnetic material. The respective sealing projection groups have at least 6 or more of a predetermined desired number of projections provided within a predetermined width in the axial direction. Preferably, as shown in FIGS. 6, 8 to 16 projections may be provided respectively. At positions corresponding to the two lines of sealing projection groups 40A1, 40A1, pole blocks 40B, 40B made of the magnetic material are fitted to the inner circumferential face of the magnetic fluid seal cover 41 with O-rings 80A, 80A for sealing. Spaces between outer circumferential faces of the respective 8 projections 40A1, 40A1, 40A1 and inner circumferential faces of the pole blocks 40B, 40B are formed at contactless minute space of 0.05 mm or less (close to the inner circumferential face without contact). The space can be realized by the high accuracy bearings 40D, 40D at both sides. Then, permanent magnets 40M are provided with fitting between the two pole blocks 40B, 40B on the inner circumferential face of the magnetic fluid seal cover 41. Also, high accuracy magnetic fluid 40F exists between the annular sealing projection groups 40A1, 40A1 and the inner circumferential faces of the pole blocks 40B, 40B. Further, a magnetic flux is formed by the permanent magnet 40M in a loop circuit formed in a ring shape by the permanent magnet 40M, the two pole blocks 40B, 40B and the two lines of projection groups 40A1, 40A1. Then, the magnetic fluid 40F gathers at spaces between the projections 40A1 of the projection groups 40A1, 40A1 and the inner circumferential faces of the pole blocks 40B, 40B to shut off both sides in the axial direction, so that the high vacuum condition of a suction space 45 is maintained without generation of the sliding resistance.

The number of these projection groups 40A1, 40A1 is determined, as a labyrinth seal, at a number standing up to the suction power vacuumizing V from a suction bore 42. A fluid supplying passage 40H is provided on an outer face of the permanent magnetic 40M of the magnetic fluid seal cover 41 in the penetrating status. Then, the permanent magnet 40M is kept warm by a supplying fluid "Q4" of $N_2$ gas or a supplied fluid "Q4" of air from this fluid supplying passage 40H. Alternatively, by introducing F the magnetic fluid 40M from the fluid supplying passage 40H, it is made available to supply the magnetic fluid 40M between the inside of the inner circumferential face of the pole blocks 40B, 40B and the projection groups 40A1, 40A1. There are cases that the permanent magnet 40M formed in a ring shape is sandwiched between the pole blocks 40B, 40B, or large number of the permanent magnet formed in a cylinder shape are arranged in the circumferential direction between the pole blocks 40B, 40B. Further, a cross section shape of the outer circumferential faces of the projections 40A1 is preferably formed in a sharp mountain shape or a "M" shape. This magnetic fluid seal device 40 is constituted so as to make available to maintain high vacuum condition or higher vacuum condition by shutting off the vacuum passage 10H in the vacuum use cylindrical shaft 10 against the outside. Note that, it is constituted that a vacuum force of the "V" acts to one side of the magnetic fluid seal device 40 and a vacuum force of "V3" acts to another side. By this constitution, it is available to prevent sucking gas from outside because it is constituted that vacuum faces are balanced on each side of the magnetic fluid seal device 40 due to existing O-rings and the second bearing portion 60D2 therebetween, although it is not perfect balance of the vacuum force. Therefore, the magnetic fluid 40F has durability and can shut off the vacuum condition completely.

A coupling cover 42 facing to an opening portion 10D of the second vacuum use cylindrical shaft 10B is hermetically fitted on an end face in the axial direction of the magnetic fluid seal cover 41. A suction bore 42A is provided at a position facing to the opening portion 10D of the coupling cover 42. The suction bore 42A communicates through a suction pipe 44 with the vacuumizing apparatus (vacuum pump) "Va" shown in FIG. 1. Further, the first vacuum chamber "V1" is sucked through the branch pipe 44A branched from the suction pipe 44 and coupled to the pipe penetrating to the inside of the first main body 60, so that the first vacuum chamber "V1" is maintained in the high vacuum condition. This high vacuum condition in the first vacuum chamber "V1" exerts the vacuum thermal insulation doubly on the outer circumferential side of the second vacuum chamber "V2" which exerts the vacuum thermal insulation to the first fluid passages 20A, 20A, 20A.

On the other hand, the inside of the inner circumferential face 10A2 of the vacuum use cylindrical shaft 10 is sucked from the suction bore 42A to cause the inside of the vacuum passage 10H in the high vacuum condition. With respect to this high vacuum in the vacuum passage 10H, the inside of the inner circumferential face 10A2 can be made in high vacuum condition ($10^{-3}$ Torr to $10^{-7}$ Torr) or ultra vacuum condition ($10^{-7}$ Torr or less) mentioned above, because the inside of the inner circumferential face 10A2 (vacuum passage 10H) of the vacuum use cylindrical shaft 10 is completely sealed by the high performance magnetic fluid seal 40. Note that, though, in order to make the electro resistance of the superconducting magnetic field coil at zero(0), it is necessary to make a space which is the inside of the vacuum passage 10H and the outside of the first pipe 20E or the second pipe 20E, and which is for flowing the supplying refrigerant "Q1", in the vacuum condition of $10^{-3}$ Torr or less. Though, further preferably, it is necessary to make the space $10^{-5}$ Torr or less, the high vacuum condition can be made by the magnetic fluid seal device 40 of the present invention which shuts off the inside of the vacuum passage 10H efficiently against the outside thereof. This high vacuum condition or ultra vacuum condition in the inner circumferential face 10A2 of the vacuum use cylindrical shaft 10 shuts off the outside temperature efficiently to the first pipe 20E and the second pipe 20B. Then, the supplying refrigerant "Q1" supplied from the refrigerant supplying apparatus such as cryogenic liquid helium, nitrogen, neon and the like is maintained in the cryogenic condition in the inside of the vacuum passage 10H, and supplied to a cooling portion 105 of the superconducting motor 100 through the first pipe 20E and the second pipe 20E to cool the cooling portion 105. Namely, the cryogenic liquid supplying refrigerant "Q1" supplied from the refrigerant supplying apparatus may flow into the connection fluid passage 20D through the first spaced fluid passage 20B and the second fluid passage 20C or the second spaced fluid passage 20B in high vacuum condition, when it is supplied from a stationary side first fluid passage 20A to a rotary side vacuum passage 10H as a rotary joint R is center.

At this time, the sliding faces of the seal face 1A1 of the rotary seal ring 1A and the counter seal face 2A1 of the stationary seal ring 2A of the second mechanical seal device 1 can maintain the supplying refrigerant "Q1" in liquid condition by the effects of the cryogenic temperature due to the vacuum thermal insulation. Therefore, the respective seal faces 1A1, 2A1 which are lubricated by this liquid can be prevented from wearing out. And the sealing capability of the sliding faces of the seal face 1A1 of the rotary seal ring 1A and the counter seal face 2A1 of the stationary seal ring 2A is improved. Namely, the magnetic fluid seal device 40 having pressure resistance capability is effective to lubricating action of the both seal faces 1A1, 2A1 which slide, and is available to improve sealing capability by maintaining cryogenic temperature of the supplying refrigerant "Q1" which communicates the second mechanical seal device 1. Then, abrasion, burn-in and/or squealing noise (sneaking) of the both seal faces 1A1, 2A1 can be prevented effectively.

Also, since the first and second pipes 20E, 20E, 20E are arranged in the inside of the inner circumferential face 10A2 of the vacuum use cylindrical shaft 10, the outer circumferential face of the first and second pipes 20E, 20E, 20E can be covered (coated) by thermal insulation material such as PTFE, silica and the like. For this reason, the sealing capability of the second mechanical device 1 can be maintained by exerting the thermal insulation effect of the first pipes 20E, 20E and the second pipes 20E. Note that, in a conventional rotary joint, it was difficult to cover an outer circumferential face of a fluid passage by thermal insulation material, because a fluid passage was formed by complicated bore processings to a housing.

Also, almost same pressure refrigerant flows in the first and second spaced fluid passage 20B, 20B arranged in parallel at the second mechanical seal device 1. Therefore, both sides in the radial direction of the seal face 1A1 and the counter seal face 2A1 which closely contact each other become almost same pressure, and leaking of the discharging refrigerant "Q2" which is vaporized from a space between the both sliding seal faces 1A1, 2A1 to the supplying refrigerant "Q1" can be prevented effectively. Then, the sealing capability of the second mechanical seal device 1 improves further. Thus, it is available to prevent temperature of the supplying refrigerant "Q1" from rising by mixing the evaporated discharging refrigerant "Q2" to the supplying refrigerant "Q1" on the way as conventional manner. Also, the supplied cryogenic supplying refrigerant "Q1" cools a liquid sump portion of cooling portion 105 to the cryogenic temperature, so that the cooling portion (superconducting magnetic field coil) 105 of the superconducting motor 100 can be made in the condition that the electric resistance is zero (0). As a result, when the superconducting magnetic field coil is magnetized, a strong magnetic field without magnetizing loss is generated around the superconducting magnetic field coil wherein the electric resistance is zero (0).

Figure 7:
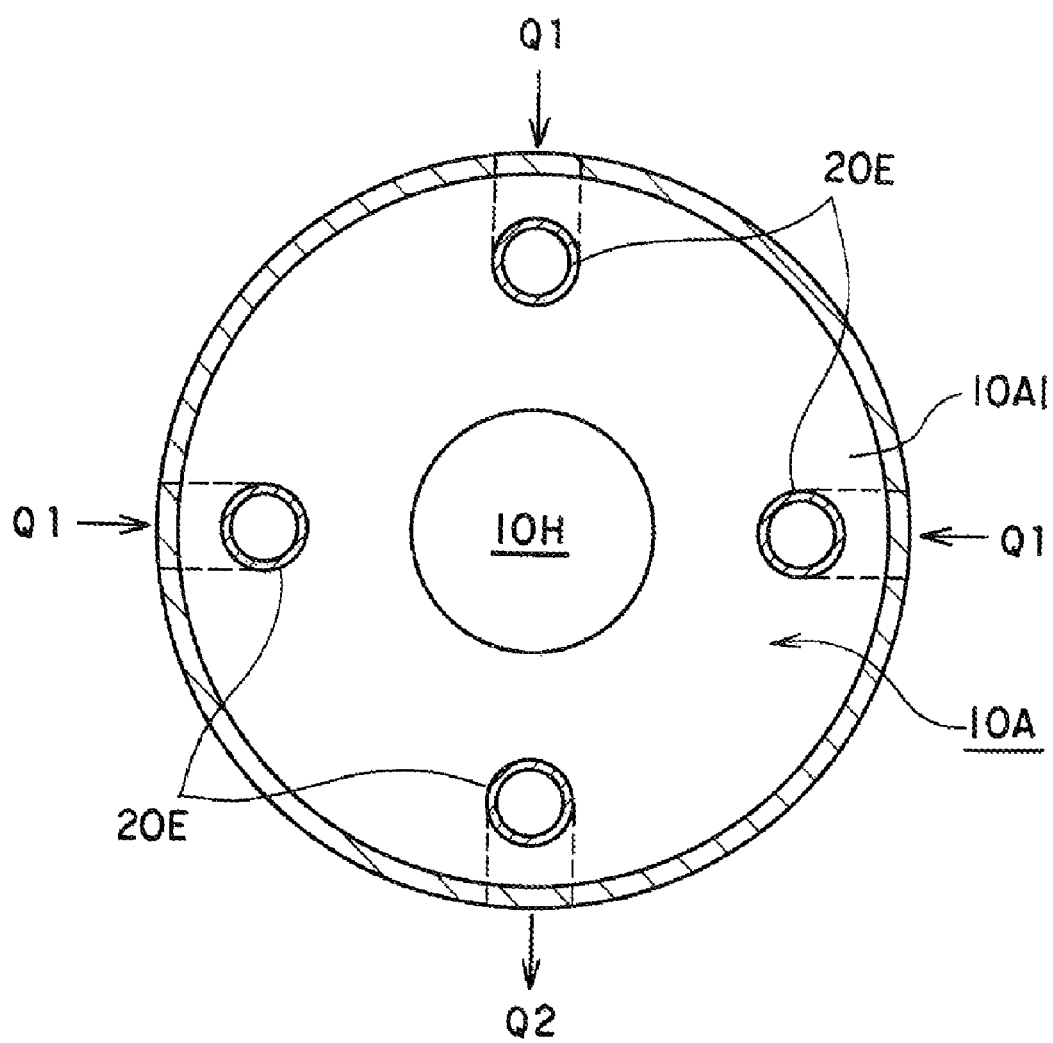
FIG. 7 is a front view on a connecting component side of an embodiment 2 in an axial direction according to the present invention.

FIG. 7 shows a second embodiment and is a front view of the connecting component 10A1 corresponding to a view in the X-X arrows direction in FIG. 1. This connecting component 10A1 is formed in a cylindrical shape shorter than the connecting component 10A1 shown in FIG. 2, and a vacuum passage 10H in a circular shape is formed in an inner circumferential face 10A2 thereof. Then, in FIG. 7, as similar with the connecting fluid passage 20D shown in the connecting component 10A1 of FIG. 2, the first pipes 20E are formed at a large number positions such as 4 or 5 or 6 (4 positions in FIG. 4) in the radial direction of the connecting component 10A1. the fluid passage parts in the radial direction of the connecting fluid passages 20D at 3 or 4 or 5 positions in the 4 or 5 or 6 positions are formed at almost same position in the axial direction. The left one position is arranged at a position between two mechanical seals in the axial direction. Then, joint portions of the respective first pipes 20E are hermetically fitted respectively to the connection bores 20D1 of the connecting fluid passages 20D of the 3, 4, 5 positions. Note that, in thess first pipes 20E, the supplying refrigerant "Q1" is flowed. Also, the second pipe 20E is hermetically fitted to and connected with the left one position of the connection bore 20D1 (for numeral reference, refer to FIG. 2). In the second pipes 20E, the discharging refrigerant "Q2" is flowed. Since the connection component 10A1 is formed as a cylindrical shape with short length in the axial direction, the axial direction length of the vacuum passage 10H can be shortened too.

Also, the effect of vacuum thermal insulation can be improved by forming the inside in the radial direction of the inside of the connecting component 10A1 in various shapes. For example, the front shape of the vacuum passage 10H in the connecting component 10A1 is not limited to a circular shape, but also it can be formed in a square shape, a shape with concave and convex faces such as a star shape or a geared shape, an oval shape and the like, to couple large number of the first pipes 20E and the second pipes to the side faces of the connection component 10A1. Note that, only one of the second mechanical seal is enough for the 3 or 4 or 5 positions of the connecting fluid passages 20D, 20D, 20D at the same position in the axial direction, by using the rotary seal ring 1A shown in FIG. 8. Then, in an arrangement with only one or two mechanical seal, the superconducting magnetic field coil can be cooled to cryogenic temperature by connecting the first pipes 20E respectively to the connection component 10A1 in which multiple number of the connection fluid passage 20D are provided to supply the supplying refrigerant "Q1" to multiple numbers of the superconducting magnetic field coil of the superconducting motor 100.

FIG. 8 is a front view of the rotary seal ring 1A in the axial direction, which is fitted to the vacuum use cylindrical shaft 10. This rotary seal ring 1A is an embodiment 3. The rotary seal ring 1A shown in FIG. 8 is an example wherein the second fluid passages 20C penetrating to the inside thereof are provided at four positions along a circumferential face thereof. an inner circumferential face 1A3 of the rotary seal ring 1A is fitted to the outer circumferential face of the connecting component 10A1 to communicate the four positions of the second fluid passages 20C with the four positions of connecting fluid passages 20D respectively. Then, the supplying refrigerant "Q1" supplied from the one position of first fluid passage 20A is flowed into the four positions of second fluid passages 20C. Also, respective seal faces 1A1, 1A1 are formed on both end faces of the rotary seal ring 1A. Further, seal mounting grooves 1A4, to which a seal ring 83B shown in FIG. 3 can be mounted, are formed on the inner circumferential side of the both seal faces 1A1 of the rotary seal ring 1A. With respect to the second fluid passages 20C of the rotary seal ring 1A and the connecting fluid passages 20D of the connecting component 10A1, although it is specified as 4 numbers example, the second fluid passages 20C, the connecting fluid passages 20D and the second pipes 20E may be provided multiple such as 5 or 6 corresponding to e to the number of the cooling portion 105.

In this manner, it becomes possible to supply the supplying refrigerant "Q1" to the multiple numbers of cooling portions 105 without increasing of number of the second mechanical seal device. This constitution that the supplying refrigerant "Q1" can be supplied to the multiple numbers of the cooling portions 105 by the one second mechanical seal device 1, can be realized by a combination of the constitution of the second mechanical seal device and the connecting component 10A1 of the present invention. Note that, as another example, there is a case that the second mechanical seal device 1 is consist of one second mechanical seal device. In this case, although it is not shown in drawings, the discharging refrigerant is flowed back to the refrigerant supplying apparatus through the second pipe provided in other fluid passage. Note that, the constitution with two mechanical seals shown in FIG. 3 is a preferable arrangement.

As a comparing example of the present invention, in FIG. 1, in case that the magnetic fluid seal device 40 is replaced to a conventional magnetic fluid seal device, because the magnetic fluid of the magnetic fluid seal device is sucked to a vacuum side in response to high vacuum condition, there will be no magnetic fluid from the projection groups due to movement thereof, so that it becomes difficult to maintain the vacuum condition in the vacuum passage. For this reason, the vacuum thermal insulation effect is decreased, too. Accordingly, it will be difficult to cool the cooling portion unless large amount of the supplying refrigerant is flowed by making diameters of the first pipe larger. As a result, a running cost of the costly supplying refrigerant used for the superconductive motor increases. Also, in a constitution wherein the large amount of the refrigerant is supplied, a manufacturing cost increases, because the rotary joint becomes larger. Also, there is a case that it becomes difficult to mount the rotary joint due to the mounting position, because a mounting location of the rotary joint becomes larger.

INDUSTRIAL APPLICABILITY

The present invention relates to a rotary joint which is useful for supplying a supplying refrigerant such as liquid nitrogen, liquid helium and the like from a refrigerant supplying apparatus on the stationary side to a cooling portion of a superconducting apparatus which is rotating in the condition that the cryogenic temperature of the refrigerant is maintained.

The invention claimed is:
1. A rotary joint for connecting fluid passages for a refrigerant between a refrigerant supplying apparatus on a stationary side and a cooling portion on a rotary side, comprising:
   a vacuum use cylindrical shaft rotatably supported by a main body and having a vacuum passage penetrating in an axial direction, a coupling portion to make available to communicate with a communication passage of said cooling portion at one end of said vacuum passage, an opening portion for vacuumizing at another end of said vacuum passage, and a connecting portion at a middle of said coupling portion and said opening portion;
   a mechanical seal device comprising a mechanical seal having a rotary seal ring hermetically fitted to said connecting portion of said vacuum use cylindrical shaft and having respective seal faces at both end faces, a pair of stationary seal rings provided at both sides in the axial direction of said rotary seal ring and having counter seal faces hermetically contacting to said seal faces, a pair of annular elastic bellows having a joint portion at one end connected hermetically with an end portion on an opposite side of said counter seal face of said respective stationary seal rings and a fixed portion at another end enclosing said vacuum use cylindrical shaft and fixed to said main body to press said stationary seal ring elastically to said seal face, a first spaced fluid passage formed between both said elastic bellows and available to communicate with a first fluid passage for introducing a supplying refrigerant, a second fluid passage penetrating through said rotary seal ring in the radial direction and communicating with said first spaced fluid passage;
   a first outer cylinder hermetically coupled at one end in the axial direction of said mechanical seal device and forming an interval with an outer circumferential face of said vacuum use cylindrical shaft as a first vacuum passage inserted into said first outer cylinder;
   a second outer cylinder hermetically coupled at another end in the axial direction of said mechanical seal device and forming an interval with an outer circumferential face of said vacuum use cylindrical shaft as a second vacuum passage inserted into said second outer cylinder;

a connecting fluid passage provided at inside of said connecting portion, communicated with said second fluid passage at one end, and having a connecting bore at another end;

a first pipe arranged in said vacuum passage of said vacuum use cylindrical shaft, and having a fluid passage connected with said connecting bore at one end and available to communicate with said cooling portion;

a connection cover having a suction port facing to said opening portion of said vacuum use cylindrical shaft for vacuumizing inside of said vacuum passage; and a magnetic fluid seal device for hermetically coupling said connection cover and said vacuum use cylindrical shaft in relatively rotatable condition and for shutting off a flow between said vacuum passage of said vacuum use cylindrical shaft and an outer circumferential side of said connection cover, wherein said first vacuum passage communicates with a first spaced vacuum passage between an inner circumferential face of said stationary seal ring on one end side of said mechanical seal device and said vacuum use cylindrical shaft, said first spaced vacuum passage communicating with an inner circumference of said counter seal face of said stationary seal ring, said second vacuum passage communicates with a second spaced vacuum passage between an inner circumferential face of said stationary seal ring on another end side of said mechanical seal device and said vacuum use cylindrical shaft, said second spaced vacuum passage communicating with an inner circumference of said counter seal face of said stationary seal ring, and said inner circumferential side of said counter seal face of said stationary seal ring on said one end side and said inner circumferential side of said counter seal face of said stationary seal ring on said another end side are vacuumized by vacuumizing said first vacuum passage and said second vacuum passage.

2. The rotary joint as set forth in claim 1, wherein said mechanical seal device is constituted by two sets of said mechanical seals arranged in parallel, a second spaced fluid passage is provided between both mechanical seals, and said second spaced fluid passage communicates with a second pipe for said discharging refrigerant arranged in said vacuum passage so that a discharging refrigerant flows in said second spaced fluid passage.

3. The rotary joint as set forth in claim 1, wherein a cylindrical first body enclosing said first outer cylinder and said second outer cylinder to form a first vacuum chamber on an outer circumferential side thereof is provided, and said first vacuum chamber is vacuumized.

4. The rotary joint as set forth in claim 1 wherein said rotary seal ring comprises a plurality of said second fluid passages along a circumferential face thereof, and said connecting portion comprises a plurality of connecting fluid passages which communicate to said second fluid passages so that a supplying refrigerant is flowed from said first fluid passage to openings of said respective second fluid passages provided at the circumferential face of said rotary seal ring.

* * * * *